Aug. 6, 1957  F. X. KENNELLY ET AL  2,802,204
ACCELERATION OPERATED SWITCH
Filed May 10, 1954  2 Sheets-Sheet 1
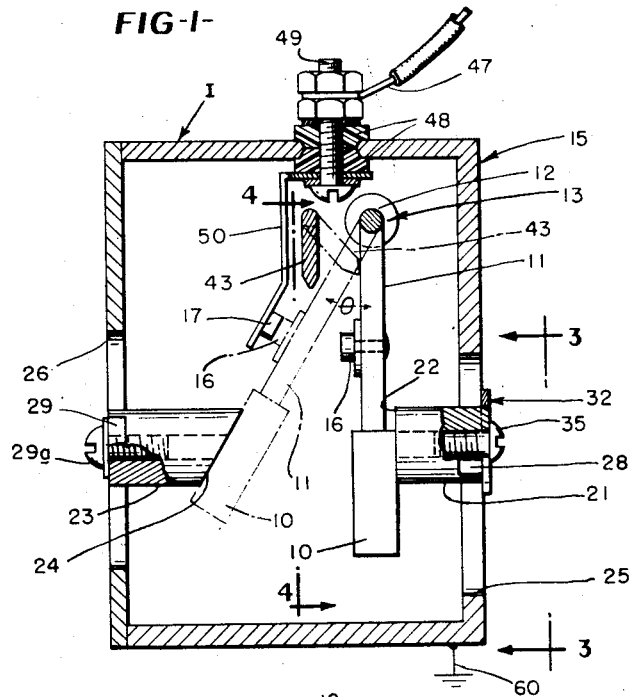
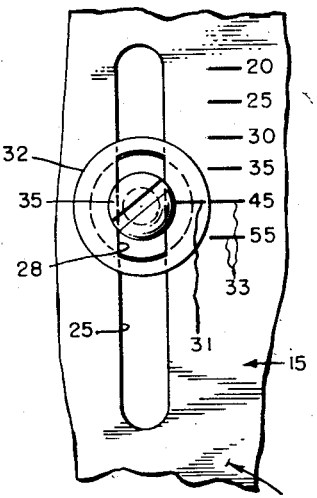
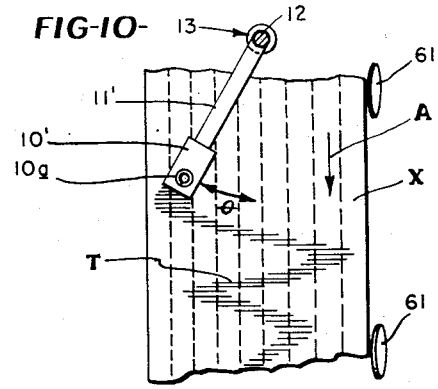
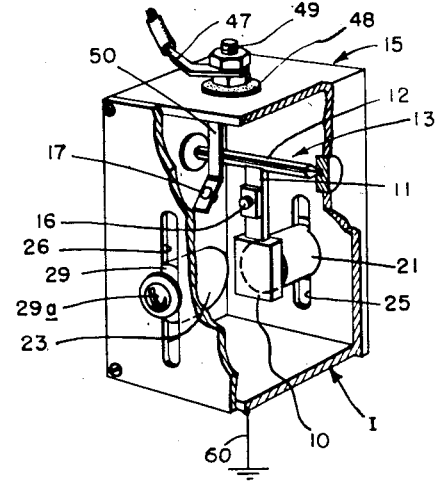
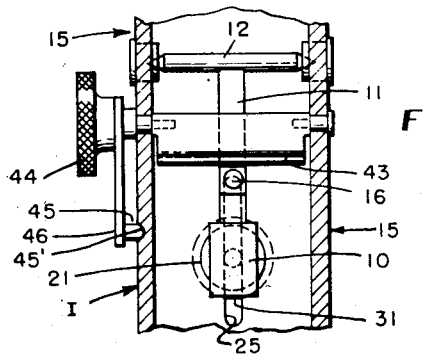
INVENTORS
EVERETT STEWART PETERSON, JR
and FRANCIS XAVIER KENNELLY
BY
Cushman, Darby & Cushman

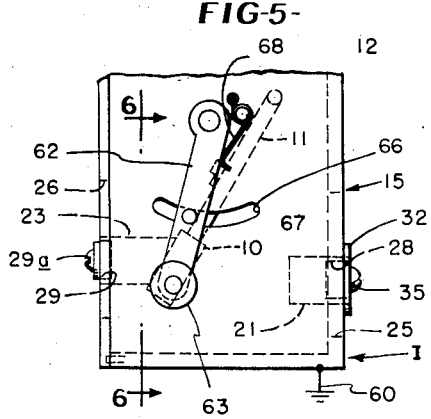
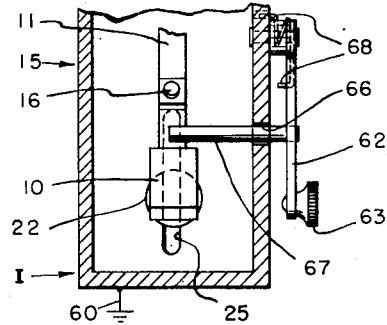
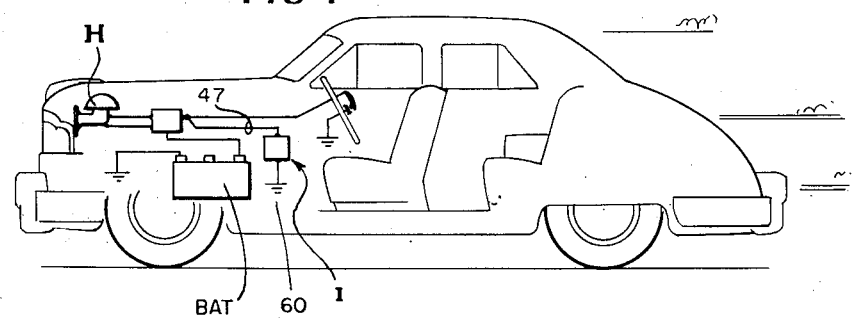
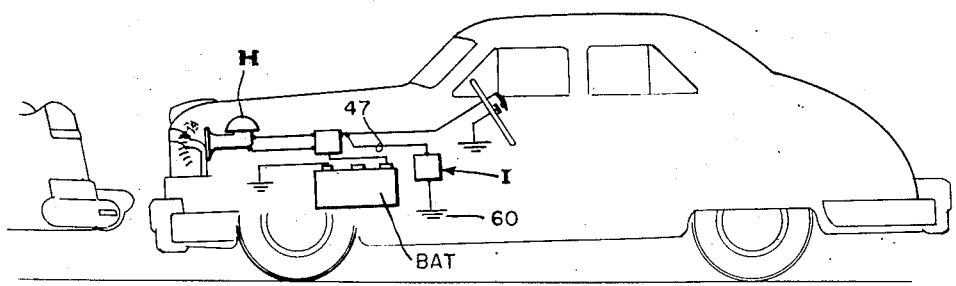
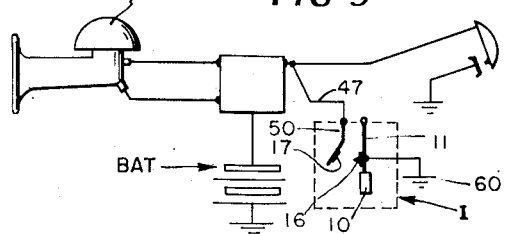
INVENTORS
EVERETT STEWART PETERSON, JR.,
and FRANCIS XAVIER KENNELLY.

United States Patent Office 2,802,204
Patented Aug. 6, 1957

2,802,204

ACCELERATION OPERATED SWITCH

Francis X. Kennelly, Washington, D. C., and Everett Stewart Peterson, Jr., Columbia, S. C.

Application May 10, 1954, Serial No. 428,479

3 Claims. (Cl. 340—262)

This invention relates to improvements in accelerometers and more particularly to devices which may be used as instruments for recording, indicating or measuring acceleration.

More particularly, this invention relates to acceleration activated inertia devices which measure, record, and indicate quantums of imposed acceleration forces.

The apparatus disclosed herein comprises improvements in such devices which are adapted to actuate electro-mechanical mechanisms, such as a limit switch or an inertia actuated primary circuit maker or breaker.

One of the objects of this invention is to provide a novel instrument of the electro-mechanical type for measuring the acceleration or change of acceleration of a moving body upon which it is mounted such as, for example, an automobile, an airplane, locomotive or ship.

Another object of this invention is to provide a novel instrument for measuring the components of an imposed acceleration force along a desired axis.

A further object of this invention is to provide an instrument embodying means for measuring and recording the magnitude duration and direction of imposed acceleration forces.

It is still a further object of this invention to provide an instrument for signaling, either occularly or auricularly, the action of such forces upon the instrument or upon the body to which the instrument is attached.

It is yet another object of this invention to provide a means for calibrating the instrument whereby its function may be controlled within desired limits.

It is a final object of this invention to provide a means for recording or indicating the presence of inertia or acceleration forces which will remain operative when the instrument itself, or the body to which it is attached, is inclined or tilted.

These and other objects of our invention will be more fully understood from the following detailed description of a typical preferred form and application of the invention, throughout which description reference is made to the accompanying drawings in which:

Figure 1 is an elevational view, taken in section, with portions broken away to more clearly illustrate details of the invention, of an acceleration energized switch;

Figure 2 is a perspective view of the switch with portions of the side walls broken away to more clearly illustrate the relative positions of the elements of the apparatus;

Figure 3 is an enlarged fragmentary elevational view taken along lines 3—3 of Figure 1;

Figure 4 is a section taken along lines 4—4 of Figure 1;

Figure 5 is a fragmentary elevational view illustrating a modification of the invention;

Figure 6 is a section taken along lines 6—6 of Figure 5;

Figure 7 is a diagrammatic illustration of the invention applied to an automobile horn circuit;

Figure 8 is a diagrammatic view of an automobile in Figure 7 being subjected to high deceleration forces;

Figure 9 is a line diagram of an automobile electrical horn circuit provided with an acceleration energized switch in accordance with this invention; and Figure 10 is a fragmentary elevational view of the interior of the housing, illustrating a modification of the invention.

Referring to Figures 1 and 2, there is illustrated an inertia unit I in which a pendulum 11, depending from pivot shaft 12, is pivotally suspended within a non-magnetic housing, indicated generally at 15. The pendulum carries a weight or mass 10 disposed in spaced relation from its pivoted end. The pendulum also carries an electrical contact point 16 between the mass 10 and the pivot shaft 12, as will be discussed hereinafter. It will be readily seen that the pendulum is suspended to swing in a planar arc normal to the pivot shaft 12.

On either side of the weight 10 and within the planar arc of the pendulum 11, are two stop means or abutments 21 and 23, respectively. Abutment 21 comprises a cylindrical body of soft iron, or some other magnetic material, and has one planar face 22 disposed adjacent the weight 10 when the pendulum hangs in its plumb position. The opposite planar surface of the abutment 21 is provided with an offset key 28 which slidably fits within a vertically disposed slot 25 in the wall of casing 15. Abutment 21 is movably secured in position with its axis normal to the inner surface of the side wall of the casing 15 by the provision of a screw 35, extending through washer 32 on the exterior surface of housing 15, which is threadably engaged with a tapped centrally disposed aperture in the abutment 21. When screw 35 is loosened, the abutment may be selectively raised or lowered to any desired position within the limits defined by the length of slot 25. Positive rotation of the screw then will clamp the abutment fast in the selected position.

There is also provided a second abutment 23 disposed in the arc of pendulum 11 and on the second side of the weight 10. This abutment is also formed of cylindrical stock of soft iron, or some other magnetic material, with one planar end formed with a key 29 slidably disposed in a vertically extending slot 26 in the wall of casing 15. Abutment 23 is also provided with an adjustment screw 29a with which the vertical position of the abutment may be selectively adjusted in a manner similar to the placement of abutment 21, discussed hereinabove. The free end 24 of the abutment is obliquely formed so as to present a surface which is co-planar with the sides of weight 10 when the pendulum is transposed to the position illustrated in phantom in Figure 1. It will thus be seen that the abutments 21 and 23 limit the arcuate motion or swing of the pendulum to a relatively small angle $\theta$.

The housing 15 is provided with a terminal 49, insulated with non-conducting washers 48, which receives lead wire 47 which may be energized by a battery, generator, or other means (as shown in Figure 9). Depending from the terminal 49 is a conducting bracket 50 carrying an electrical contact point 17 on the free end thereof. As best shown in Figures 1 and 2, this first contact point is so disposed that it will meet and touch the contact point 16 when the pendulum is transposed through the angle $\theta$ to a position with the weight 10 fast against the abutment 23. As the housing 15 is grounded as at 60, the transposition of the pendulum through $\theta$, closing the contact between points 16 and 17, will close the circuit of lead wire 47 and will energize any electrical operated signal means served by this circuit.

In a preferred embodiment of this invention the weight 10 is formed of magnetic material which is permanently magnetized, by any suitable means, so that it will be attracted and held against either of the abutments 21 and 23 which happen to be adjacent the weight at a given moment. For example, when the weight is hanging in a normal or plumb position, the weight is disposed next to the abutment 21, and will be held fast thereto by the co-attraction between the magnetized magnetic material of the weight 10 and the magnetic unmagnetized material of the abutment 21. When the magnetic attraction between the weight 10 and abutment 21 is broken, and the pendulum arcuately transposed through angle θ to the position shown in phantom, the co-attraction between magnetized magnetic material of the weight 10 and the unmagnetized magnetic material of the abutment 23 will serve to hold the two members in their abutting relation. As both abutments 21 and 23 may be selectively vertically transposed in their slots 25 and 26, respectively, the extent of the co-attraction between the abutments and the magnet 10 may be varied. That is, the movement of the abutments will vary the number of lines of flux of the magnet 10 which pass concurrently through the magnet and the adjacent abutment and hence the value or degree of the co-attraction can be regulated.

Pivotally disposed within the housing is a pendulum return bar 43 which is formed of an non-conducting material such as plastic, or fiber board, and which is selectively movable by manipulation of knurled handle 44 which is secured thereto and which is disposed on the exterior of the casing 15. As shown in Figure 4, the knob is provided with a depending resilient lever 46 having detent button 45 projecting from the free end and contacting the exterior surface of the housing 15. The housing may be provided with one or more depressions 45' to receive and hold the spring biased detent button 45 so as to yieldably hold the control knob 44, and the bar 43, in a selected position, such as when it is desired to render the switch inoperative.

For clarity in illustrating other parts, the bar 43 is eliminated from Figure 2.

As best shown in Figure 1, the return bar 43 normally hangs in a position just clearing the pendulum 11 when the latter is transposed through the angle θ. When the knurled knob is rotatively manipulated, the return bar 43 is transposed towards the pendulum 11, as shown in phantom and will carry the pendulum away from its abutting relationship with the second abutment 23 and will return the pendulum to its plumb or normal position adjacent the abutment 21. While the magnetic attraction between the magnet 10 and the abutment 23 is sufficient to withstand normal shocks incident to the anticipated installation of the device, the leverage effect gained by the length of the return bar 43 is sufficient to break their magnetic bond and return the pendulum upon the application of finger pressure to the knurled knob 44.

Referring to Figures 5 and 6, in which there is illustrated a modification of the invention, a pendulum 11 carrying weight or mass 10, is pivotally suspended within a casing I as discussed above. Pivotally disposed on the exterior of the casing I is a lever 62 carrying a knurled operating knob 63 on a free end thereof. The operating lever carries a smooth cylindrical pin 67 projecting therefrom and into the interior of the casing I through an arcuate slot 66 provided in the side wall. As best shown in Figure 6, the pin 67 extends to the centrally disposed pendulum 11, so that rotational movement of the operating lever 62 will also carry the pendulum 11. As best shown in Figure 5, the operating lever is normally biased by spring 68 to a position with the pin in one end of the arcuate slot, in which position the pin is free from contact with the pendulum 11. When the pendulum has been transposed through angle θ to a position in which the weight 10 is adjacent or contacting the abutment 23, closing the circuit through contact points 16 and 17, and it is desired to retranspose the pendulum and break the circuit, the operating lever 62 is selectively transposed about its pivoted end and the pin 67 will impinge against the pendulum and carry it, together with the weight or mass 10, away from the abutment 23 and back to its normal or plumb position adjacent the abutment 21.

In Figures 7, 8 and 9, I have illustrated a typical exemplifying installation of the acceleration activated switch in an automobile. The switch I is installed in parallel with a battery energized circuit of an ordinary electrical horn H. The switch housing 15 is secured to the body or frame of the automobile and grounded thereto, at 60. The casing is orientated so that the plane defined by the arcuate movement of the pendulum is parallel with the longitudinal axis of the automobile, with the abutment 21 on the rearward side of the pendulum 11 and the abutment 23 on the forward side of the pendulum. When the automobile is moving in a normal manner, the pendulum 11 will be held in a plumb position by the co-attraction of the magnet 10 and the abutment 21, this attraction being great enough to hold the pendulum in such a position when the frame is subjected to normal shocks due to bumps or faults in the roadway. If, however, an emergency situation arises, and the brakes are suddenly applied to decelerate the automobile, the inertia of the mass 10 will tend to move the pendulum forwardly, that is, away from abutment 21. When the inertia or acceleration forces become greater than the magnetic forces attracting these two members together, the pendulum will swing forwardly to the position illustrated in phantom in Figure 1. As discussed hereinabove, this arcuate transposition of the pendulum 11 will bring contact point 16 into contact with contact point 17, closing the circuit of lead line 47. When, for example, this line is electrically connected with a battery and a horn as illustrated in Figure 9, the horn will be immediately energized and will sound giving a clear warning of the emergency situation. As the co-attraction of the magnet 10 and the abutment 23 will hold the pendulum in the transposed position, the contacts 16 and 17 will remain closed and the horn will continue to blow until the emergency ceases to exist and the driver breaks the circuit by rotatively manipulating the knurled handle 44 which, as stated above, returns the pendulum to its plumb position, breaking the contact between points 16 and 17.

As shown in Figure 3, the side wall of the casing 15 adjacent the slot 25 may be suitably marked or etched to carry indicia indicating the location of the set screw 35, and hence of the abutment 21, for the operation of this emergency system at a particular speed. For example, the emergency deceleration from a speed of 55 miles an hour is considerably greater than the emergency deceleration from a speed of 20 miles an hour, and hence it is desirable that there exists a greater normal co-attraction between the magnet 10 and the abutment 21 when the vehicle is to be operated at the higher speed. Otherwise, minor decelerations due to ordinary traffic maneuvering would cause the switch to operate and it will be readily seen that this could easily cause dangerous confusion. As the lines of flux surrounding the magnet 10 are more numerous in the area adjacent the magnet, the lowering of the abutment 21 brings a larger portion of its mass into the path of these lines of flux and hence increases the co-attraction of the two members. As shown in Figure 3, washer 32 may carry a radially extending mark 31 which may be matched with lines 33 indicating the various speeds, numbers of g's or other standards of measurement.

While in a preferred embodiment of the invention, the weight or mass 10 of magnetic material is magnetized and the abutments 21 and 23 of magnetic material are not magnetized, it is within the purview of this invention to reverse the position of the magnetized members, that is, it is entirely within the contemplation of this invention to magnetize the abutments 21 and 23 with the weight being of magnetic material, either magnetized or non-magnetized. In this respect it is possible to utilize any combination of magnetized and non-magnetized material as long as there is always a co-attraction between the abutment 21 and mass 10, as well as between abutment 23 and mass 10.

For the sake of clarity of description it has been assumed that the casing is installed in a plumb position relative to the automobile body or frame and that the automobile is plumb, that is, is located on a level roadway. Of course, the inclination of an automobile is constantly changing with the actual contour of the road and it is evident that the pendulum 11 will seldom be plumb when it is hanging in its normal position in contact with the abutment 21. However, the magnetic co-attraction between weight 10 and the abutment 21 will always be sufficient to maintain the pendulum in the desired position and there is no danger of accidental energization of the signal circuit.

While the signal circuit has been illustrated as being connected with an automobile horn, it is entirely within the contemplation of this invention that the circuit should energize any sensory signal apparatus whether occular or auricular, or otherwise.

In Figure 10 there is illustrated a modification of the invention in which there is provided a means for measuring and recording the intensity of the acceleration forces imposed upon the device. A flat tape X is mounted on spools 61—61, which may be rotated by suitable attachment to a motor having a regulated speed (not shown). The flat tape X may be coated with any readily magnetized substance. Such tapes have been coated with granular ferrous material and have been widely used in tape recording machines. The tape is trained to move adjacent the weight 10 in a plane parallel with the planar arc of the pendulum 11, and in a direction substantially parallel to the length of the pendulum in its plumb position. As the pendulum's movement is limited to a relatively small arc, this direction may be stated as being substantially normal to the chord of the arc of the pendulum. The mass 10' may be of a magnetic material or, as shown in the drawing, it may serve as a mounting bracket for a small powerful magnet 10a, such as a Cunife or Alnico magnet.

When the tape X is set in constant speed motion in the direction indicated by the arrow A, any acceleration forces, such as caused by a sudden braking of the vehicle, shock impulses or the like, will cause the pendulum 11' to swing within the limits of its arc. A permanent magnetic trace or record T of the amplitude and duration of these forces is left on the tape X, by the movement of the magnet 10a. This recording tape may be used in the calibration of the indicia 33 of the acceleration operated switch, or may be used independently to measure and record the acceleration forces imposed on the device, or the horizontal component of such forces if they are applied in a direction other than horizontal.

Having described only a typical preferred form and application of the invention, it is not to be limited or restricted to specific details herein set forth, but we wish to reserve to ourselves any variations or modifications that may appear to those skilled in the art and falling within the scope of the following claims.

We claim:

1. A device for energizing signal means upon being subjected to predetermined acceleration forces comprising pivotally disposed freely swinging pendulum means, a weight comprising a magnetic material carried on said pendulum means in spaced relation to the pivoted end thereof, a first stop means comprising a magnet limiting the swing of said pendulum means in one direction, a second stop means limiting the swing of said pendulum means in a second and opposite direction, an electrical contact point carried by said pendulum means to close a signal circuit when said pendulum means is proximate said second stop means, said first stop means being selectively movable transverse of the surface of said weight to vary the surface area of contact between said first stop means and said weight so as to vary the coattraction between said first stop means and said weight.

2. Acceleration activated switch means comprising a magnetic pendulum suspended to swing in a planar arc parallel with the acceleration, magnetic stop means disposed on each side of said pendulum in said arc, one of said stop means being disposed to magnetically hold said pendulum substantially normal to the acceleration, said first stop means being selectively movable relative to said pendulum to vary the number of lines of flux passing concurrently through the pendulum and said first stop means, the arrangement being such that the selective movement of said first stop means will selectively control the amount of inertia forces necessary to transpose said pendulum from said first stop means, electrical contact means carried by said pendulum to close a signal circuit when said pendulum is transposed from said first stop means, said second stop means is arranged to magnetically hold the transposed pendulum in a position maintaining said signal circuit upon the termination of inertia forces, and selectively operable pendulum return means to retranspose said pendulum to a position adjacent said first stop means, the combination of a magnetic tape trained to move at a regulated speed in a plane parallel to said arc and adjacent thereto, and in a direction substantially normal to the chord of said arc, the tape being arranged to retain traces of lines of flux of said magnetic pendulum when said pendulum is transposed by acceleration forces, and to form a permanent record of the intensity and duration of the translation.

3. Acceleration activated switch means comprising a magnetic pendulum suspended to freely swing in a planar arc parallel with the acceleration, magnetic stop means disposed on each side of said pendulum in said arc, one of said stop means being disposed to magnetically hold said pendulum substantially normal to the acceleration, said first stop means being selectively movable relative to said pendulum to vary the surface area of contact between said pendulum and said stop, and thereby the concentration of flux passing concurrently through the pendulum and said first stop means, the arrangement being such that the selective movement of said first stop means will selectively control the amount of inertia forces necessary to transpose said pendulum from said first stop means, electrical contact means carried by said pendulum to close a signal circuit when said pendulum is transposed from said first stop means, said second stop means being arranged to magnetically hold the transposed pendulum in a position maintaining said signal circuit upon the termination of inertia forces, and selectively operable pendulum return means to retranspose said pendulum to a position adjacent said first stop means, the combination of a magnetic tape trained to move at a regulated speed in a plane parallel to said arc and adjacent thereto, and in a direction substantially normal to the chord of said arc, the tape being arranged to retain traces of lines of flux of said magnetic pendulum when said pendulum is transposed by acceleration forces, and to form a permanent record of the intensity and duration of the translation.

References Cited in the file of this patent

UNITED STATES PATENTS

| 1,519,473 | Zahm | Dec. 16, 1924 |
| 2,301,383 | Dillman | Nov. 10, 1942 |
| 2,386,777 | Bentley, Jr. | Oct. 16, 1945 |

FOREIGN PATENTS

| 42,909 | Germany | Aug. 17, 1887 |
| 625,511 | Great Britain | June 29, 1949 |